(No Model.)
A. F. STEPHENS & R. T. CONNELL.
INDIVIDUAL COFFEE OR TEA SERVICE UTENSIL.
No. 569,678.  Patented Oct. 20, 1896.
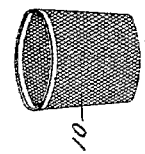
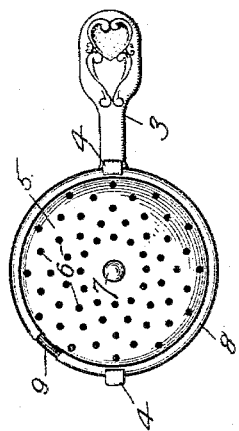
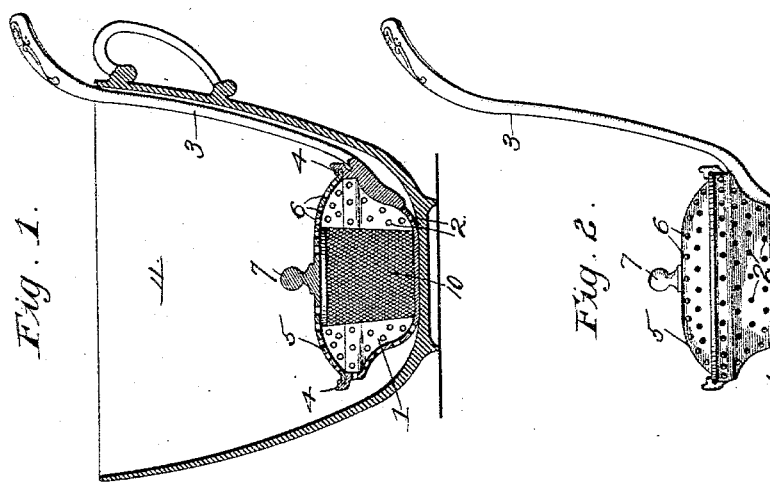
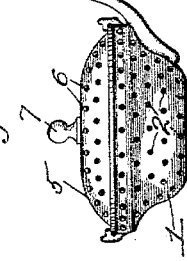
WITNESSES:
F. G. Fischer
G. F. Thorpe
INVENTORS:
Albert F. Stephens and
Richard T. Connell.
BY Higdon & Higdon
ATTYS.

UNITED STATES PATENT OFFICE.

ALBERT F. STEPHENS AND RICHARD T. CONNELL, OF ST. JOSEPH, MISSOURI.

INDIVIDUAL COFFEE OR TEA SERVICE UTENSIL.

SPECIFICATION forming part of Letters Patent No. 569,678, dated October 20, 1896.

Application filed January 13, 1896. Serial No. 575,224. (No model.)

*To all whom it may concern:*

Be it known that we, ALBERT F. STEPHENS and RICHARD T. CONNELL, of St. Joseph, Buchanan county, Missouri, have invented certain new and useful Improvements in Individual Coffee or Tea Service Utensils, of which the following is a full, clear, and exact description, reference being had to the accompanying drawings, forming a part thereof.

Our invention relates to individual tea and coffee service utensils; and the object of the invention is to produce an ornamental perforated utensil to be placed in a coffee or tea cup and to contain the requisite amount of coffee or tea, so that when boiling water is poured into the cup and allowed to stand for a few minutes coffee or tea of more or less strength will be the result. After it has attained sufficient strength to suit the taste of the person who is to consume it the utensil containing the coffee or tea is removed, and the coffee or tea, entirely free from dregs, may be sugared according to taste.

With this object in view the invention consists in certain peculiar and novel features of construction and arrangement, as will be hereinafter described and claimed.

In order that the invention may be fully understood, reference is to be had to the accompanying drawings, in which—

Figure 1 represents a vertical section of a cup and of an individual coffee-service utensil embodying our invention in their proper relative positions. Fig. 2 is a detail side elevation of the utensil. Fig. 3 is a top plan view of the same. Fig. 4 is a detached perspective view of the coffee-receiver which in practice is arranged within the utensil.

In the said drawings, 1 designates a bowl of any suitable or preferred configuration and ornamentation which may be made in china or of metal ware, the material of which it is made of course regulating the price of the article. This bowl, which will probably slightly exceed in size the bowl of a spoon, is perforated, and is provided with a handle 3, like a spoon. At diametrically opposite points the retaining-lugs 4 project from the upper edges of the bowl to receive the flanged edge of the cover 5, which cover is perforated like the bowl. Said cover is provided centrally with the upwardly-projecting knob 7, whereby it may be grasped in manipulation. The flange 8 of the cover is provided with a notch 9 for convenience in placing the cover upon or removing it from the bowl, the operation being as follows: The cover is arranged with said notch 9 vertically above one of the retaining-lugs 4, and said flange is fitted under the opposing lug. With such lug as a pivot the cover is then lowered so that the opposite lug projects upwardly through said opening. The cover is then twisted in order to move said lug and said opening out of vertical alinement, so that both lugs will snugly engage the flange 8 of the cover, which therefore cannot be accidentally disengaged or dislodged from position unless the utensil be turned upon its side.

To remove the cover when in its proper position, it is necessary to reverse the operation already described, when it can be easily and quickly lifted from the bowl. 10 designates a foraminous cylinder, which may be of the same material as the utensil, but preferably will be formed of wire mesh of the required degree of fineness. This cylinder fits loosely within the bowl, as shown clearly in Fig. 1. The whole utensil, when it is desired to make coffee, is placed within the cup 11, as also illustrated in Fig. 1, after the required quantity of coffee is placed within the foraminous cylinder. Boiling water may now be poured into said cup in the required quantity and has access to the coffee through the perforated utensil and cylinder.

If the person for whom the coffee is designed prefers to have the coffee of more or less strength, it is allowed to stand for a greater or less length of time, so that with a predetermined charge or quantity of coffee within each utensil the taste of the consumers may be accommodated. In other words, with a similar charge of coffee each person may have his coffee of strength to suit his taste by simply letting it stand a sufficient length of time. This may be conveniently ascertained by tasting the same at short intervals, and when the coffee is suited to the taste the utensil with its contents may be removed. If tea be desired, the foraminous cylinder is filled with that article, and after the cylinder is replaced within the utensil the hot water may be poured in the cup, as before. The cylinder being preferably of sufficient size to receive snugly the proper quantity of tea for a single cup, the expansion of it after contact with the water causes an internal pressure, whereby the essence of the tea is extracted more quickly and tea of the required strength consequently produced. The strength of the tea will increase, of course, the longer it stands, the same as the coffee, so that individual tastes of the consumers may be accommodated in the same manner. After the tea has attained the strength desired the utensil with its contents may be removed from the cup and the tea sweetened to the taste, as desired.

Thus it will be seen that we have produced, as a new article of manufacture, an individual coffee and tea service utensil which will be found of great utility and advantage where a number of guests are to be served, and which will be found particularly of great service in hotels, where the guests are numerous and their tastes as regards strength of coffee and tea are unknown. It will also be found of great advantage for use in social gatherings generally and in a great many other connections not necessary to enumerate.

It is obvious, of course, that a utensil of this character may be manufactured at a comparatively slight cost and sold in sets like spoons.

Having thus described the invention, what we claim as new, and desire to secure by Letters Patent, is—

As a new article of manufacture, an individual coffee or tea service utensil, comprising a perforated bowl having a handle, a lid or cover for the same also provided with a handle, and a foraminous cylinder or casing within said bowl held in place by the bottom of the bowl and the cover thereof, substantially as shown and described.

In testimony whereof we affix our signatures in presence of two witnesses.

ALBERT F. STEPHENS.
RICHARD T. CONNELL.

Witnesses:
FRANK J. SENNINGER,
DANIEL C. CONNELL.